(12) United States Patent
Conroy et al.

(10) Patent No.: US 11,972,378 B2
(45) Date of Patent: Apr. 30, 2024

(54) VEHICLE DISPATCH USING MACHINE LEARNING

(71) Applicant: FORD GLOBAL TECHNOLOGIES, LLC, Dearborn, MI (US)

(72) Inventors: Donald Conroy, Grosse Ile, MI (US); Hyongju Park, Ann Arbor, MI (US); Jeffrey McLendon, Canton, MI (US); Fiona Gronowicz, Plymouth, MI (US); Subrahmanyam Gade, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 632 days.

(21) Appl. No.: 16/806,696

(22) Filed: Mar. 2, 2020

(65) Prior Publication Data

US 2021/0272036 A1    Sep. 2, 2021

(51) Int. Cl.
*G06Q 10/0631*    (2023.01)
*G06N 20/00*    (2019.01)

(52) U.S. Cl.
CPC ....... *G06Q 10/06315* (2013.01); *G06N 20/00* (2019.01)

(58) Field of Classification Search
CPC ....... G06Q 10/06315; G06Q 10/06312; G06Q 50/26; G06N 20/00; G08G 1/0112; G08G 1/0129; G08G 1/0145; G08G 1/202
USPC ......................................................... 705/13
See application file for complete search history.

(56) References Cited

U.S. PATENT DOCUMENTS

| 8,626,565 | B2 | 1/2014 | Petroff | |
|---|---|---|---|---|
| 9,384,491 | B1 | 7/2016 | Briggs et al. | |
| 10,349,148 | B2 | 7/2019 | Sieja et al. | |
| 2016/0148121 | A1 | 5/2016 | Durham et al. | |
| 2018/0315319 | A1* | 11/2018 | Spector | G01C 21/3407 |
| 2018/0357907 | A1* | 12/2018 | Reiley | H04W 4/023 |
| 2019/0050807 | A1* | 2/2019 | Ferguson | G05D 1/0027 |
| 2019/0197798 | A1* | 6/2019 | Abari | G06N 20/00 |
| 2019/0325546 | A1* | 10/2019 | Hagestad | G06Q 10/06315 |
| 2020/0380629 | A1* | 12/2020 | Monteil | G06Q 10/067 |
| 2020/0410406 | A1* | 12/2020 | Leary | B60Q 9/00 |
| 2021/0233196 | A1* | 7/2021 | Qin | G06Q 10/047 |

OTHER PUBLICATIONS

Holler, John, et.al.; "Deep Reinforcement Learning for Multi-Driver Vehicle Dispatching and Repositioning Problem"; Nov. 25, 2019. (Year: 2019).*

(Continued)

*Primary Examiner* — Dione N. Simpson
(74) *Attorney, Agent, or Firm* — Vichit Chea; Brooks Kushman P.C.

(57) ABSTRACT

A dispatch database maintains, for a plurality of vehicles available for dispatch, vehicle data and constraints data. A processor is programmed to execute a dispatch server to perform operations including to receive a dispatch request requesting a vehicle to arrive at a request location, utilize a machine-learning model to identify one or more of the plurality of vehicles to respond to the dispatch request, the machine-learning model utilizing the vehicle data and the constraints data as inputs to determine the one or more of the plurality of vehicles, and inform the one or more of the plurality of vehicles of the dispatch request.

12 Claims, 7 Drawing Sheets

(56) References Cited

OTHER PUBLICATIONS

Al-Abbasi, Abubakr, et. al.; "DeepPool: Distributed Model-Free Algorithm for Ride-Sharing Using Deep Reinforcement Learning"; IEEE Transactions on Intelligent Transportation Systems, vol. 20, No. 12, Dec. 2019. (Year: 2019).*

* cited by examiner

VEHICLE DISPATCH USING MACHINE LEARNING

TECHNICAL FIELD

Aspects of the disclosure generally relate to the use of machine learning in the dispatch of mobile aid and service vehicles.

BACKGROUND

Mobile emergency and service response vehicles are typically dispatched to a location based on response vehicle capabilities and proximity to the location. Inputs to the decision-making process are limited to identifying which response vehicles are geographically closest to the location and may not consider other factors impacting the response time.

SUMMARY

In one or more illustrative examples, a system for use of machine learning for dispatch of mobile aid and service includes a dispatch database maintaining, for a plurality of vehicles available for dispatch, vehicle data and constraints data; and a processor. The processor is programmed to execute a dispatch server to perform operations including to receive a dispatch request requesting a vehicle to arrive at a request location, utilize a machine-learning model to identify one or more of the plurality of vehicles to respond to the dispatch request, the machine-learning model utilizing the vehicle data and the constraints data as inputs to determine the one or more of the plurality of vehicles, and inform the one or more of the plurality of vehicles of the dispatch request.

In one or more illustrative examples, a method for use of machine learning for dispatch of mobile aid and service includes maintaining, for a plurality of vehicles available for dispatch, vehicle data and constraints data; receiving a dispatch request requesting a vehicle to arrive at a request location; utilizing a machine-learning model to identify one or more of the plurality of vehicles to respond to the dispatch request, the machine-learning model utilizing the vehicle data and the constraints data as inputs to determine the one or more of the plurality of vehicles; and informing the one or more of the plurality of vehicles of the dispatch request.

In one or more illustrative examples, a non-transitory computer-readable medium includes instructions for use of machine learning for dispatch of mobile aid and service that, when executed by a processor, cause the processor to maintain, for a plurality of vehicles available for dispatch, vehicle data and constraints data; receive a dispatch request requesting a vehicle to arrive at a request location; utilize a machine-learning model to identify one or more of the plurality of vehicles to respond to the dispatch request, the machine-learning model utilizing the vehicle data and the constraints data as inputs to determine the one or more of the plurality of vehicles; and inform the one or more of the plurality of vehicles of the dispatch request

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
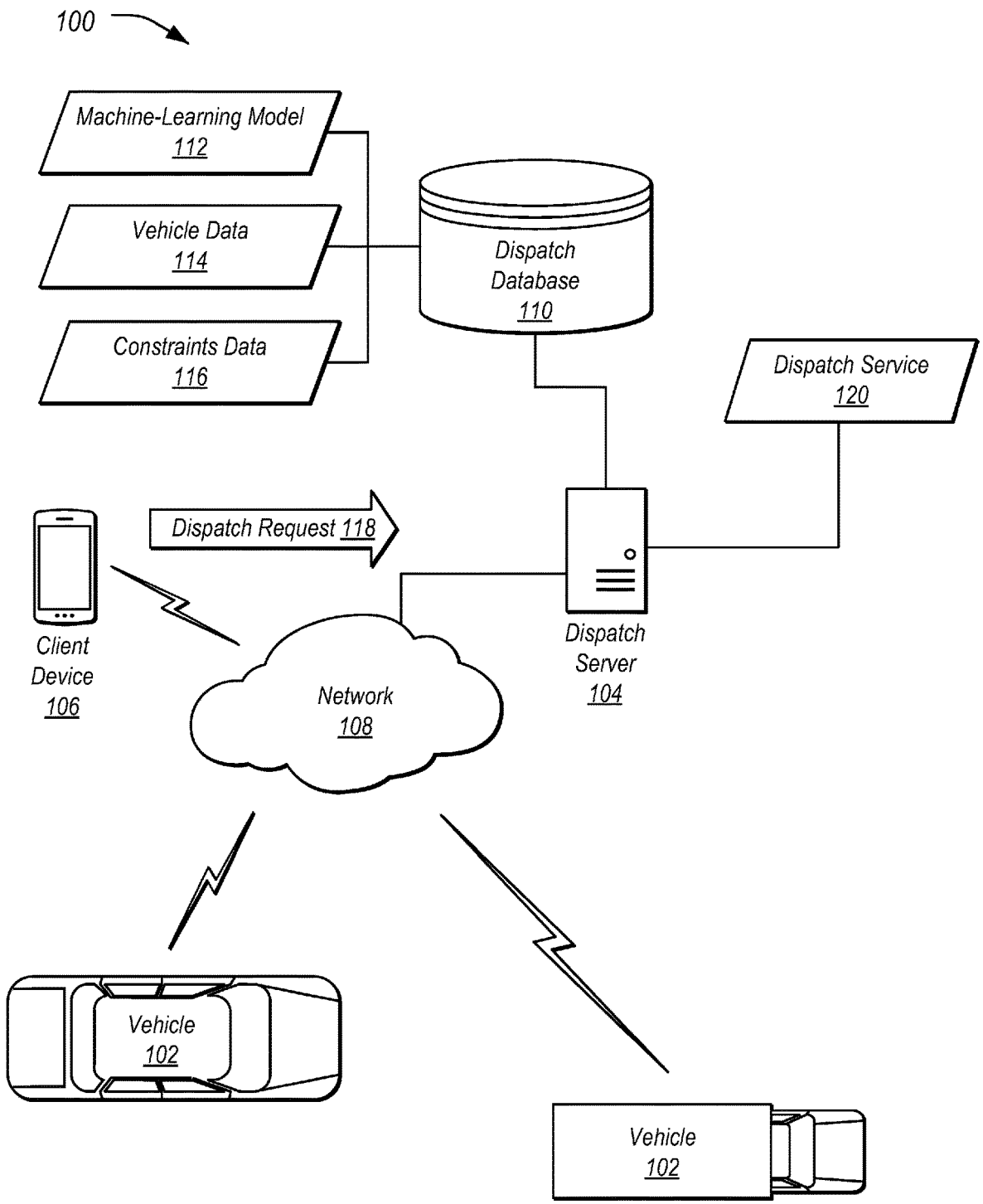
FIG. 1 illustrates an example system for the use of machine learning in the dispatch of mobile aid and service vehicles.

FIG. 1 illustrates an example system 100 for the use of a machine-learning model 112 in the dispatch of mobile aid and other services. These services may include, for example, emergency services, grocery services, vehicle maintenance services, ride-share services, pick up and/or delivery services, or any other types of services for which it may be desirable to dispatch vehicles 102 to a location or locations. As shown, the system 100 includes connected vehicles 102 configured to communicate with a dispatch server 104 over a wireless network 108. The dispatch server 104 is in communication with a dispatch database 110 that stores the machine-learning model 112, vehicle data 114, and constraints data 116. The dispatch server 104 includes a dispatch service 120 that is configured to utilize the machine-learning model 112 and the other information in the dispatch database 110 to handle dispatch requests 118 from client devices 106. It should be noted that this is merely an example, and systems 100 with more, fewer, or different components may be used. For instance, while two vehicles 102 are shown, typical systems may manage the dispatch of many more vehicles 102.

The vehicles 102 may include telematics control units (TCUs) or other computing devices with wireless connectivity. As some other examples, the vehicles 102 may include other computing devices, such as in-vehicle infotainment sources or center stack or rear-seat infotainment systems. The dispatch server 104 may also be a computing device, such as one or more hardware servers or server instances maintained by a cloud service provider. The client devices 106 may be any of various types of portable computing device, such as cellular phones, tablet computers, smart watches, laptop computers, portable music players, or other devices having processing and communications capabilities.

Figure 2:
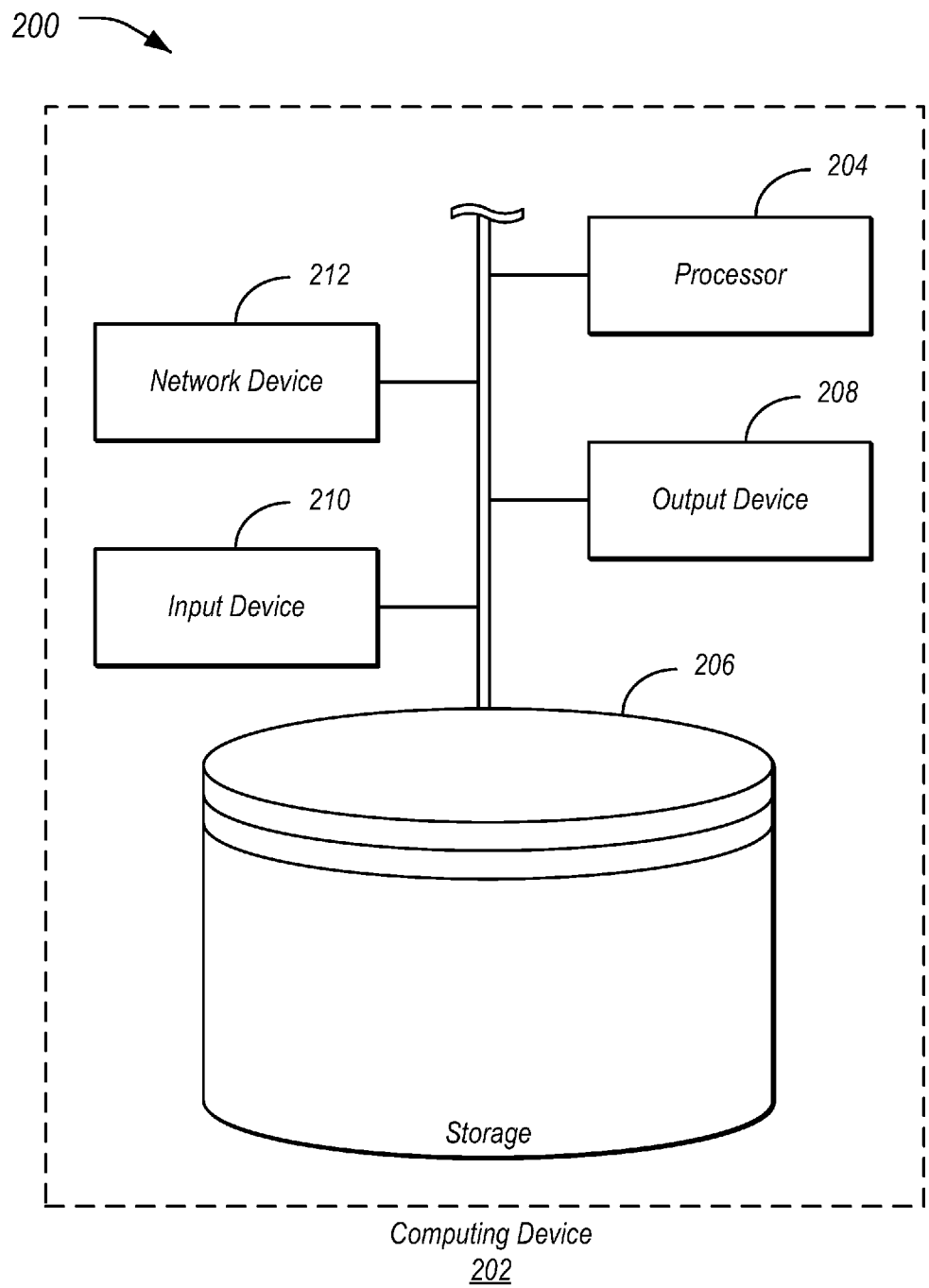
FIG. 2 illustrates an example of a computing device.

FIG. 2 illustrates an example 200 of a computing device 202. Referring to FIG. 2, and with continuing reference to FIG. 1, the vehicles 102, dispatch server 104, and client devices 106 include examples of such computing devices 202. As shown, the computing device 202 may include a processor 204 that is operatively connected to a storage 206, an output device 208, an input device 210, and a network device 212. It should be noted that this is merely an example, and computing devices 202 with more, fewer, or different components may be used.

The processor 204 may include one or more integrated circuits that implement the functionality of a central processing unit (CPU) and/or graphics processing unit (GPU). In some examples, the processors 204 are a system on a chip (SoC) that integrates the functionality of the CPU and GPU. The SoC may optionally include other components such as, for example, the storage 206 and the network device 212 implemented into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation the processor 204 executes stored program instructions that are retrieved from the storage 206. The stored program instructions, accordingly, include software that controls the operation of the processors 204 to perform the operations described herein. The storage 206 may include both non-volatile memory and volatile memory devices. The non-volatile memory includes solid-state memories, such as NAND flash memory, magnetic and optical storage media, or any other suitable data storage device that retains data when the computing device 202 is deactivated or loses electrical power. The volatile memory includes static and dynamic random-access memory (RAM) that stores program instructions and data during operation of the system 100.

The GPU of the client device 106 may include hardware and software for display of at least two-dimensional (2D) and optionally three-dimensional (3D) graphics to the output device 208 of the client device 106. The output device 208 may include a graphical or visual display device, such as an electronic display screen, projector, printer, or any other suitable device that reproduces a graphical display. As another example, the output device 208 may include an audio device, such as a loudspeaker or headphone. As yet a further example, the output device 208 may include a tactile device, such as a mechanically raiseable device that may, in an example, be configured to display braille or another physical output that may be touched to provide information to a user. In yet a further example, the output device 208 may be a haptic feedback device.

The input device 210 may include any of various devices that enable the computing device 202 to receive control input from users. Examples of suitable input devices that receive human interface inputs may include keyboards, mice, trackballs, touchscreens, voice input devices, graphics tablets, and similar devices.

The network devices 212 may each include any of various devices that enable the dispatch server 104 and client devices 106, respectively, to send and/or receive data from external devices over networks (such as the network 108).

Examples of suitable network devices 212 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

Referring back to FIG. 1, the dispatch database 110 may be a data store configured to facilitate storing, accessing, and retrieving various kinds of data. Example data stores may include a hierarchical database, a set of files in a file system, an application database in a proprietary format, a relational database management system (RDBMS), etc. An RDBMS may employ structured query language (SQL) in addition to a language for creating, storing, editing, and executing stored procedures, such as the/SQL language. More specifically, the dispatch database 110 may be configured to maintain information including the machine-learning model 112, the vehicle data 114, and the constraints data 116.

In artificial intelligence (AI) or machine learning systems, model-based reasoning refers to an inference method that operates based on a machine learning model 112 of a worldview to be analyzed. Generally, the machine learning model 112 is trained to learn a function that provides a precise correlation between input values and output values. At runtime, a machine learning engine uses the knowledge encoded in the machine learning model 112 against observed data to derive conclusions such as a diagnosis or a prediction. Example machine learning systems may include the TENSORFLOW AI engine made available by Google Inc. of Mountain View, Calif., and the pyTorch machine learning library made available by Facebook, Inc. of Menlo Park, Calif., although other machine learning systems may additionally or alternately be used. As discussed in detail herein, the machine learning model 112 may be configured to make decisions regarding the dispatch of vehicles 102, accounting for vehicle data 114 and constraints data 116.

The vehicle data 114 may include various aspects with respect to the vehicles 102 that may be dispatched. As some examples, the vehicle data 114 may include one or more of location of the vehicle 102, speed of the vehicle 102, make and model of the vehicle 102, as well as other attributes of the vehicle 102 (e.g., seating capacity, seats available, distance to empty, time since last maintenance, whether a fault was detected with the vehicle 102, etc.). In some examples, the vehicle data 114 may be sent from the vehicles 102 to the dispatch server 104, to allow the dispatch server 104 to maintain updated vehicle data 114 for the vehicles 102 available for dispatch.

The constraints data 116 may include various factors to be considered for the selection of a vehicle 102 for dispatch. As some examples, the constraint data 116 may include distance of the vehicle 102 to a location, travel time of the vehicle 102 to the location, capabilities of the vehicle 102, capacity of the vehicle 102, and availability of the vehicle 102.

The dispatch server 104 may receive a dispatch request 118 from a client device 106. The dispatch request 118 may be a request for a vehicle 102 to arrive at a request location where the vehicle 102 is needed. In an example, a user of the client device 106 may input to the client device 106 that the user's vehicle has a maintenance issue, such as a flat tire. In another example, the client device 106 may automatically send the dispatch request 118 to the dispatch server 104, e.g., based on automated monitoring of DTCs or other aspects of the user's vehicle.

The dispatch service 120 may be an example of a software application installed to the dispatch server 104. When executed by the dispatch server 104, the dispatch service 120 may utilize the machine learning model 112 to respond to the dispatch request 118. In responding, the dispatch service 120 may, in an example, indicate which of the vehicles 102 is to be dispatched to handle the dispatch request 118. As discussed in detail below in illustrative examples, the dispatch service 120 may make use of machine learning in the dispatch of mobile aid and other services.

Figure 3:
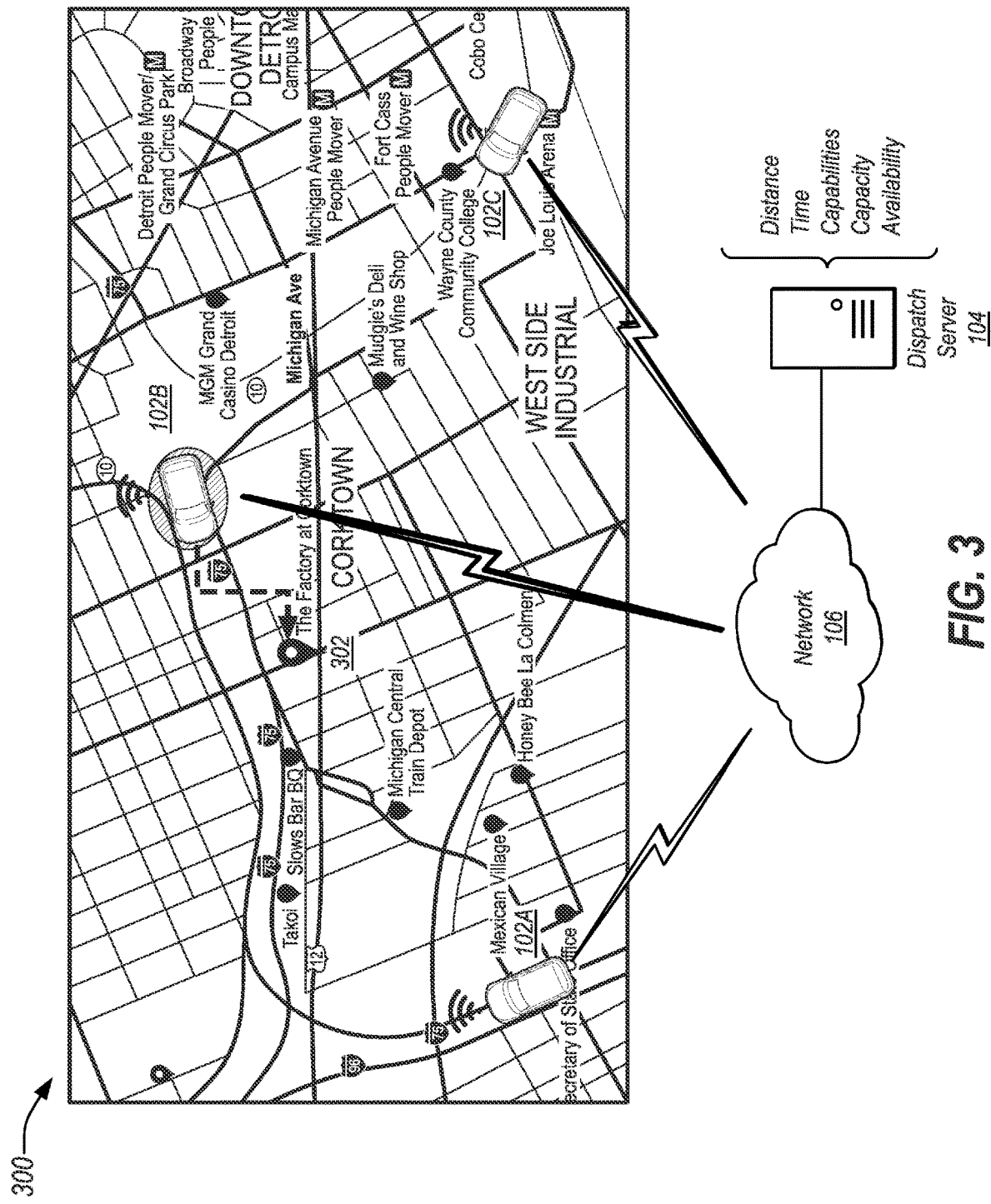
FIG. 3 illustrates an example of use of the dispatch server to select and manage the dispatch of vehicles to a request location.

FIG. 3 illustrates an example 300 of use of the dispatch server 104 to select and manage the dispatch of vehicles 102 to a request location 302. For instance, the request location 302 may have been received by the dispatch server 104 in a dispatch request 118. In the illustrated example 300, the dispatch server 104 is programmed to receive current location information for the vehicles 102 of the system 100, e.g., as reported by telematic control units (TCU) or global navigation satellite system (GNSS) units of the vehicles 102.

To decide which of the vehicles 102 to use, the dispatch service 120 of the dispatch server 104 utilizes the machine-learning model 112. The dispatch server 104 inputs various factors into the machine-learning model 112, including the capabilities of the vehicles 102, drive time to the location for the vehicles 102, distance to the location for the vehicles 102, and available operating times of the vehicles 102. The machine-learning model 112 may also make use of other non-vehicle-related constraints, such as capacity, availability, and capability of target service locations (e.g., medical centers), as discussed in further detail below. Using this information, the machine-learning model 112 identifies a most-appropriate vehicle 102 to be dispatched to the request location 302. As shown, the vehicles 102A, 102B, and 102C are available to the dispatch service 120, and the dispatch service 120 identified the vehicle 102B to handle the dispatch to the request location 302.

In another example, the machine-learning model 112 offers a list of probabilities of each of the vehicles 102 to be most-appropriately to be dispatched to the request location 302. For instance, the best two, three, or five vehicles 102 may be sent a request to handle the dispatch to the request location 302. The first vehicle 102 that accepts the dispatch request 118 may send a confirmation to the dispatch server 104, and the dispatch server 104 may inform the other most-appropriate vehicles 102 that the dispatch has been accepted.

Thus, the machine-learning model 112 may be used to select and dispatch one of the vehicles 102 based on the current locations of all the vehicles 102 reported by the vehicle 102, accounting for capabilities, of each of the vehicles 102 as well as drive time, distance, and available operating times of the vehicles 102.

Figure 4:
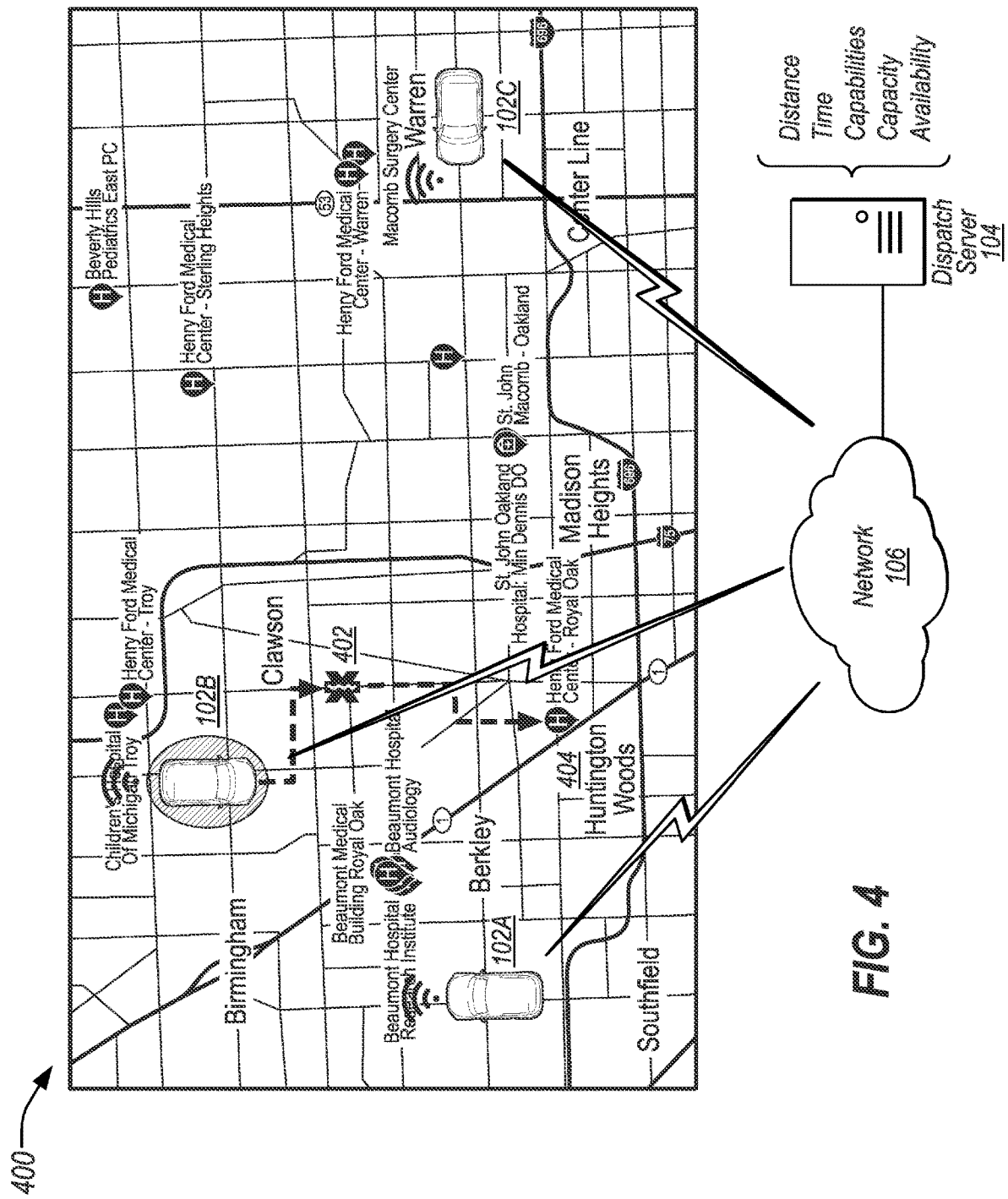
FIG. 4 illustrates an example of use of the dispatch server to select and manage the dispatch of vehicles to a pickup location and then to a drop-off location.

FIG. 4 illustrates an example 400 of use of the dispatch server 104 to select and manage the dispatch of vehicles 102 to a pickup location 402 and then to a drop-off location 404. For instance, the pickup location 402 may have been received by the dispatch server 104 in a dispatch request 118. In some examples, the drop-off location 404 may also be specified in the dispatch request 118. However, in other examples, the drop-off location 404 may be specified in terms of capabilities that are being requested. For instance, if the dispatch request 118 is from an individual with a cardiac concern, then the capabilities may include a hospital having an available cardiac unit or an available alternative with a cardiac specialist. Alternatively, if the dispatch request 118 is from an individual wishing to purchase groceries, then the capabilities may include a store at which the desired item or items are available for purchase. Thus, in such examples the drop-off location 404 may be determined from one or more of a set of possible drop-off locations 404 have the desired capabilities.

Similar to the example 300, to decide which of the vehicles 102 to use, the dispatch service 120 of the dispatch server 104 utilizes the machine-learning model 112. The dispatch server 104 inputs various factors into the machine-learning model 112, including the capabilities of the vehicles 102, current drive time to the location for the vehicles 102, distance to the location for the vehicles 102, available operating times of the vehicles 102, and also the capabilities of the possible drop-off locations 404. Using this information, the machine-learning model 112 identifies a most-appropriate vehicle 102 (or probabilities of a set of most-appropriate vehicles 102) to be dispatched to the request location 302. As shown, the vehicles 102A, 102B, and 102C are available to the dispatch service 120, and the vehicle 102B handles the dispatch to the pickup location 402 and then to the drop-off location 404.

Additionally, the machine-learning model 112 (or another machine-learning model 112) may be used to determine which drop-off location 404 of the set of possible drop-off locations 404 to use. Inputs to the machine-learning model 112 for this determination may include the desired capabilities of the drop-off locations 404, current availability/wait time of the drop-off locations 404, and distances to the drop-off locations 404, among other factors. For instance, it may be preferable to go to a drop-off location 404 that is further away but with immediate availability to obtain a faster overall response time.

Thus, the machine-learning model 112 may account for current locations of the vehicles 102 (e.g., as reported by their TCU or GNSS units) and the capabilities of each of the vehicles 102, current drive time, distance, and available operating times in selecting the vehicle 102 to use. Moreover, in addition to selecting the vehicle 102, the dispatch server 104 may further dispatch the vehicle 102 to a location based on machine-learning model 112 to account for drive time, distance, capabilities, capacity, and available operating times of each of the possible drop-off locations 404.

Figure 5:
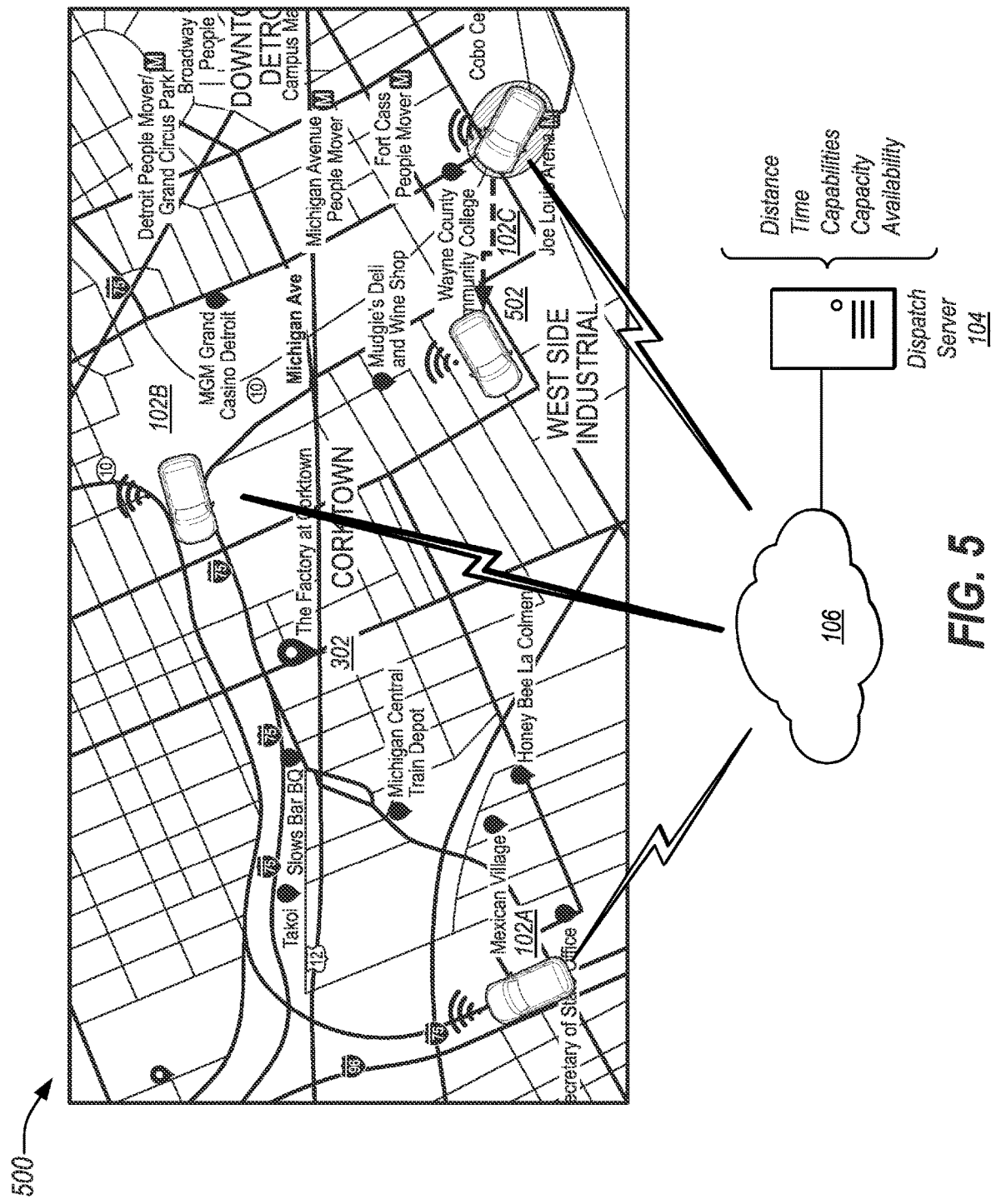
FIG. 5 illustrates an example of use of the dispatch server to select and manage the dispatch of vehicles to a dynamic location.

FIG. 5 illustrates an example 500 of use of the dispatch server 104 to select and manage the dispatch of vehicles 102 to a dynamic location 502. For instance, the dispatch request 118 may indicate an identifier of a vehicle (e.g., automobiles, scooters/electric bikes equipped with GNSS devices), a smartphone or other client device 106, or any other identifiable object whose location can be tracked and that varies in location.

The dispatch server 104 may track the location of the dynamic location 502. For instance, the dispatch server 104 may receive location updates for the dynamic location 502, similar to as discussed above with respect to maintaining the locations of the vehicles 102 available for dispatch. Or, in cases where the location is not identifiable by the dispatch server 104, the dispatch server 104 may request a personal estimate from the user of which vehicle 102 is closest to the dynamic location 502. Using that location, as well as the other factors as mentioned herein, the machine-learning model 112 may identify a most-appropriate vehicle 102 or vehicles 102 to handle the dispatch request 118.

Thus, the machine-learning model 112 may be used to select and dispatch one of the vehicles 102 to the dynamic location 502 based on the current location of the dynamic location 502 (e.g., a disabled vehicle in need of assistance) according to locations of the vehicles 102 as well as further factors such as capabilities of the servicing vehicle 102 or other dispatched vehicle 102, drive times, distance, and available operating times of the vehicles 102.

Figure 6:
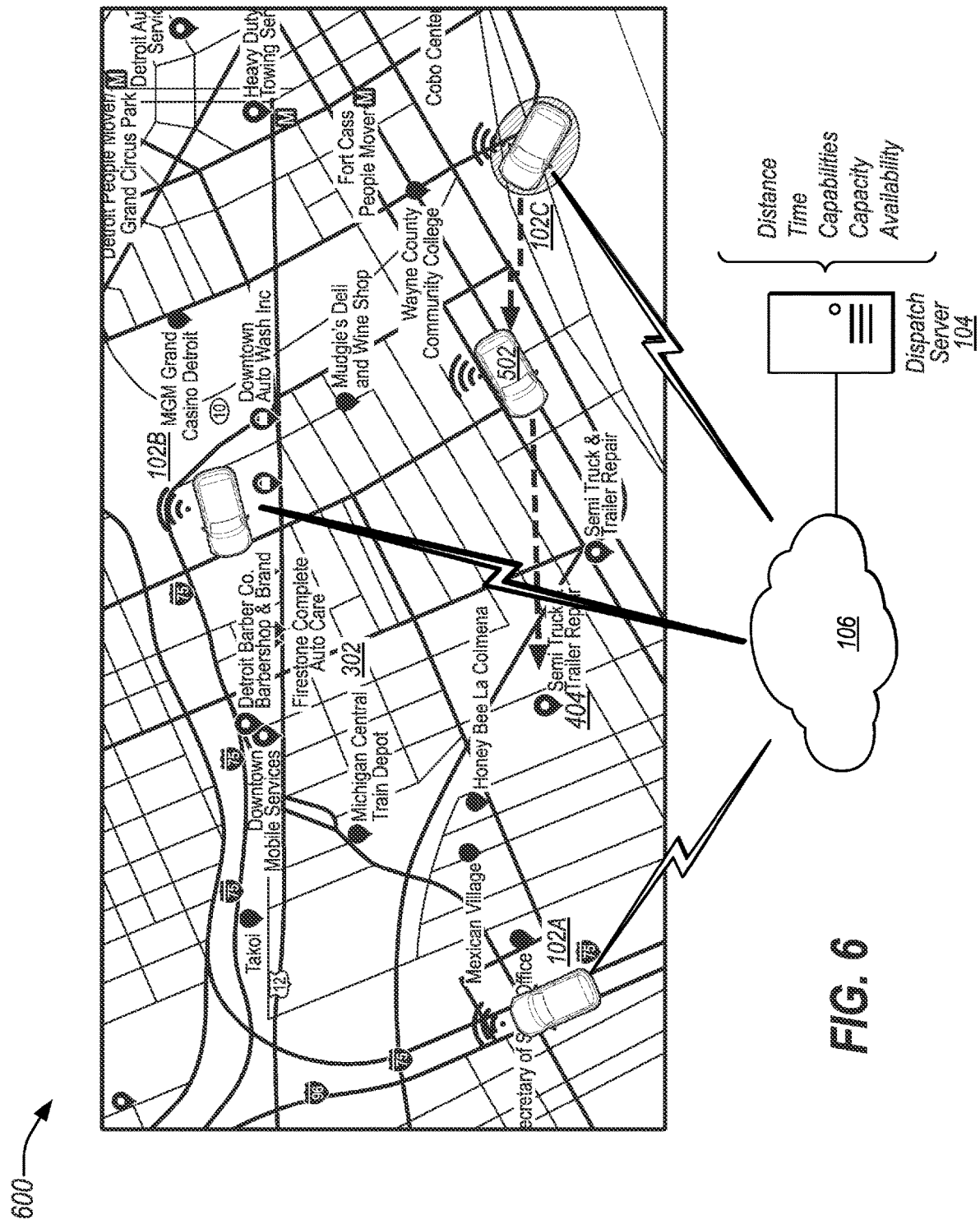
FIG. 6 illustrates an example of use of the dispatch server to select and manage the dispatch of vehicles to a dynamic location and then to a final drop-off location.

FIG. 6 illustrates an example 600 of use of the dispatch server 104 to select and manage the dispatch of vehicles 102 to a dynamic location 502 and then to a final drop-off location 404. Similar to as discussed above with respect to the example 500, the dispatch server 104 may utilize the machine-learning model 112 to handle the dynamic location 502. Similar to as discussed above with respect to the example 400, the dispatch server 104 may utilize the machine-learning model 112 to handle the drop-off location 404.

Thus, the machine-learning model 112 may be used to select and dispatch one of the vehicles 102 (e.g., a servicing vehicle 102) to another location (e.g., a disabled vehicle) based on current location of the vehicles 102, and further information such as capabilities of the vehicles 102 (e.g., what vehicle 102 repairs may be performed to the disable vehicle by the servicing vehicle 102), drive times, distance, and available operating times of the vehicles 102. Moreover, after responding to the dispatch request 118, the dispatch server 104 may further utilize the machine-learning model 112 to dispatch the vehicle 102 (e.g., the servicing vehicle 102) to a target facility (e.g., the final drop-off location 404), accounting for factors such as drive time, distance, capabilities, capacity and available operating times of the drop-off locations 404 (e.g., the repair facilities) in a given area of operation.

Figure 7:
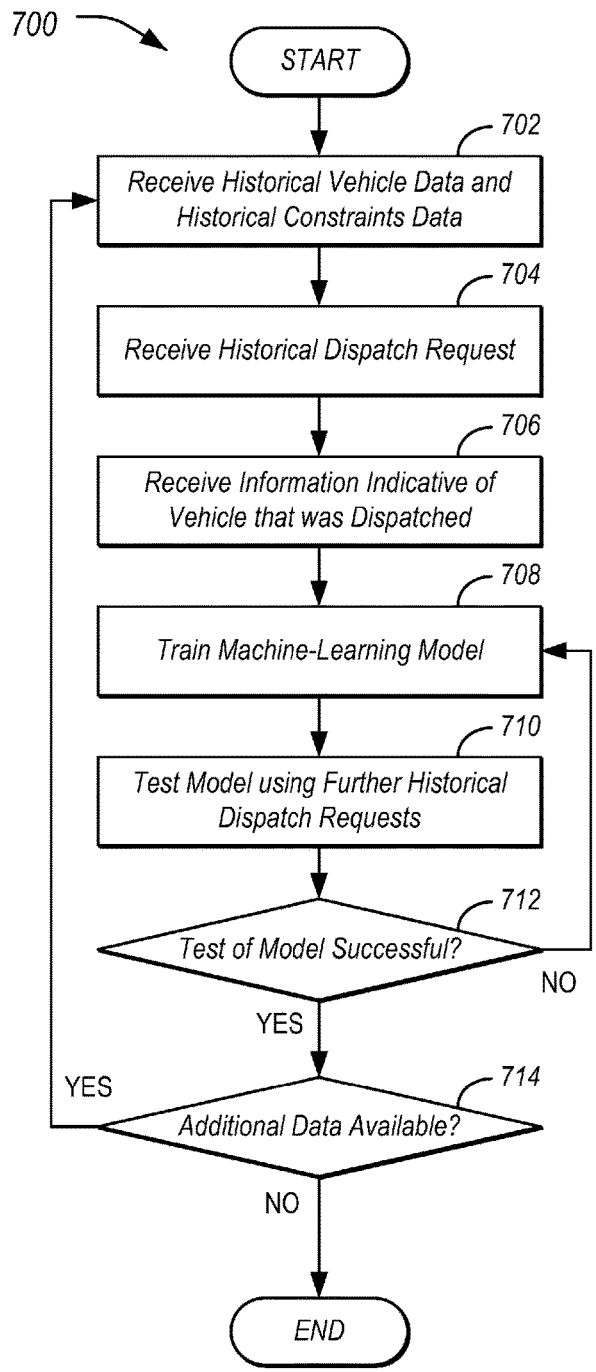
FIG. 7 illustrates an example process for training the machine-learning model in the dispatch of mobile aid and service vehicles.

FIG. 7 illustrates an example process 700 for training the machine-learning model 112 in the dispatch of mobile aid and service vehicles 102. In an example the process 700 may be performed by the dispatch server 104 in the context of the system 100.

At operation 702, the dispatch server 104 receives historical vehicle data 114 from dispatch vehicles 102 that were available for dispatch. In an example, the vehicle data 114 may include various aspects with respect to the vehicles 102 that were available for dispatch in a historical time period. As some examples, the vehicle data 114 may include one or more of location of the vehicle 102, speed of the vehicle 102, make and model of the vehicle 102, as well as other attributes of the vehicle 102 (e.g., seating capacity, seats available, distance to empty, etc.). In some examples, the historical vehicle data 114 may be received from the dispatch vehicles 102 and maintained along with timestamp information in the dispatch database 110 for later analysis. In an example, the constraints data 116 may include various factors that were captured for the time period of the historical vehicle data 114. As some examples, the constraint data 116 may include distance of the vehicle 102 to a location, travel time of the vehicle 102 to the location, capabilities of the vehicle 102, capacity of the vehicle 102, and availability of the vehicle 102. In some examples, the constraints data 116 may also be maintained along with timestamp information in the dispatch database 110 for later analysis.

At operation 704, the dispatch server 104 receives historical dispatch requests 118. These dispatch requests 118 may have been received during the period of time for which historical vehicle data 114 and historical constraints data 116 is available. This information may also be maintained in the dispatch database 110 for later analysis.

At operation 706, the dispatch server 104 receives historical information indicative of which vehicles were dispatched in response to the dispatch requests 118. This information may also be maintained in the dispatch database 110 for later analysis. Accordingly, the dispatch database 110 may include about how historical dispatch requests 118 were handled in the context of the situations in which the dispatch requests 118 were received.

At operation 708, the dispatch server 104 trains the machine-learning model 112 in the dispatch of mobile aid and service vehicles 102. In an example, the historical vehicle data 114, historical constraints data 116, and historical dispatch requests 118 may be provided as inputs to the machine-learning model 112, and the vehicle 102 that was actually dispatched may be used as ground truth for the output that the machine-learning model 112 is intended to provide.

At operation 710, the dispatch server 104 tests the machine-learning model 112 in the dispatch of mobile aid and service vehicles 102. In an example, a portion of the historical vehicle data 114 and historical constraints data 116 may be set aside from the training performed at operation 708, to be used to validate the model at operation 710. If at operation 712, the machine-learning model 112 does not appear to perform adequately in the validation (e.g., the model does not meet with ground truth for at least a minimum threshold), then additional training may be performed by returning to operation 708. If, at operation 712, the machine-learning model 112 appears to perform adequately, the process 700 may continue to operation 714 (or in other examples the process 700 may simply end). If additional data is available, control passes from operation 714 to operation 702. Thus, as additional historical data is collected, the machine-learning model 112 may be retrained to improve its performance.

Figure 8:
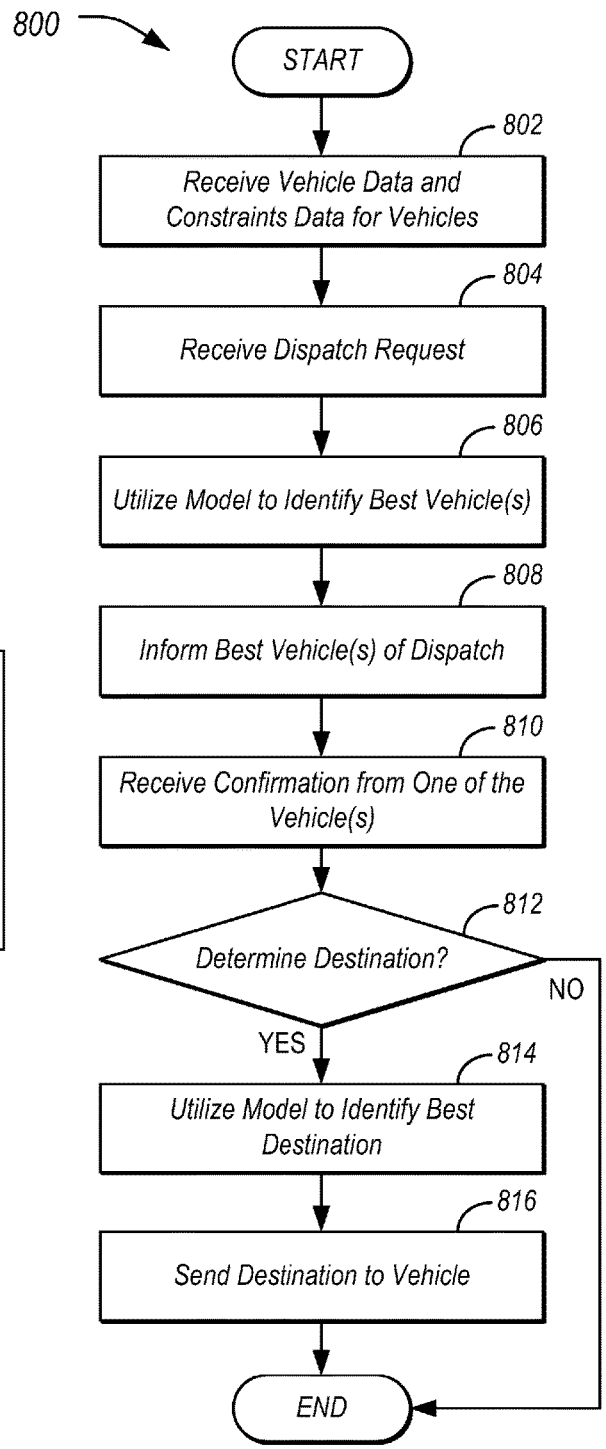
FIG. 8 illustrates an example process for use of the machine-learning model in the dispatch of mobile aid and service vehicles.

FIG. 8 illustrates an example process 800 for use of the machine-learning model 112 in the dispatch of mobile aid and service vehicles 102. As with the process 700, the process 800 may be performed by the elements of the system 100.

At operation 802, the dispatch server 104 receives vehicle data 114 and constraints data 116 from vehicles 102 that are available for dispatch. As explained above, at least a portion of this data may be received from the vehicles 102 over the network 108 via TCUs, GNSS units, or other networked devices of the vehicles 102 such as smartphones.

At operation 804, the dispatch server 104 receives a dispatch request 118. In an example, a user of the client device 106 may indicate that the user's vehicle has a maintenance issue, such as a flat tire.

At operation 806, the dispatch server 104 utilizes the machine-learning model 112 to identify most-appropriate vehicles 102 to respond to the dispatch request 118. In an example, the dispatch server 104 inputs various factors into the machine-learning model 112, including the capabilities of the vehicles 102, drive time to the location for the vehicles 102, distance to the location for the vehicles 102, and available operating times of the vehicles 102. It should be noted that the request location may be dynamic and, therefore, a history or expected trajectory of the request location may be provided to the machine-learning model 112. Using this information, the training of the machine-learning model 112 allows the machine-learning model 112 to identify a most-appropriate vehicle 102 to be dispatched to the request location. A most-appropriate vehicle 102 may refer to a vehicle 102 that is identified by the trained machine-learning model 112, according to the current inputs to the machine-learning model 112, as being the most probable or one of the most probable choices for responding to the dispatch request 118. In another example, the machine-learning model 112 offers a list of probabilities of each of the vehicles 102 to be most-appropriate to be dispatched to the request location 302.

At operation 808, the dispatch server 104 informs the identified vehicle(s) 102 of the dispatch. For instance, the most-appropriate one, two, three, four, or five vehicles 102 may be sent a request to handle the dispatch to the request location 302. It should be noted that the request location may be dynamic and, therefore, tracking of the request location 302 may be provided to the vehicle 102 as the request location changes.

At operation 810, the dispatch server 104 receives confirmation from one of the vehicles 102 of acceptance of the dispatch. This may be useful in instances where multiple vehicles 102 are given the opportunity to respond to the dispatch at operation 808, or in cases with a single vehicle 102 to ensure that the vehicle 102 is responding (e.g., if no response is received within a predefined timeframe, another vehicle 102 may be chosen). The first vehicle 102 that accepts the dispatch request 118 may send a confirmation to the dispatch server 104, and the dispatch server 104 may inform the other most-appropriate vehicles 102 that the dispatch has been accepted.

At operation 812, the dispatch server 104 determines whether the destination for the dispatch is to be determined. For instance, some dispatches may not require a destination apart from the location of the initial dispatch. However, other dispatches may have both a request location, and also a destination location to go to after reaching the location of the dispatch. If a destination location is required, control passes to operation 814.

At operation 814, the dispatch server 104 utilizes the machine-learning model 112 to identify a most-appropriate available destination for the dispatch. A most-appropriate destination may refer to a destination that is identified by the trained machine-learning model 112, according to the inputs to the machine-learning model 112, as being the most probable or one of the most probable choices for a destination to respond to the request. In an example, the machine-learning model 112 (or another machine-learning model 112) may be utilized to determine which drop-off location 404 to use. Inputs to the machine-learning model 112 for this determination may include the desired capabilities of the drop-off locations 404, availability of the drop-off locations 404, and distances to the drop-off locations 404, among other factors. For instance, it may be preferable to go to a drop-off location 404 that is further away but readily available to get a faster overall response time. It should be noted that in some examples, the dispatch request may dictate that a drop-off location 404 is to be used, and in such cases then there may be no need to utilize machine learning to identify the drop-off location 404.

At operation 816, the dispatch server 104 sends the drop-off location 404 to the vehicle 102. After operation 816, the process 800 ends. Responsive to completion of the process 800, data indicative of how the dispatch request 118 was handed may be added to the historical information in the dispatch database 110. In addition, feedback on the handling of the dispatch request 118 may also be received to the dispatch server 104. For instance, the client device 106 may provide an indication of whether the vehicle 102 was appropriate for the dispatch request 118, was timely, whether a correct drop-off location 404 was chosen, etc. Such information may all be used to improve the training of the machine-learning model 112, e.g., using a process such as the process 700.

In general, the processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for use of machine learning for dispatch of mobile aid and service, comprising:
 a dispatch database maintaining, for a plurality of vehicles available for dispatch, vehicle data and constraints data; and
 a processor programmed to execute a dispatch server to perform operations including to:
  receive a dispatch request requesting a vehicle to arrive at a request location,
  utilize a machine-learning model to identify a subset of the plurality of vehicles to respond to the dispatch request, the subset including vehicles indicated, by the machine-learning model, as being most probable choices to handle the dispatch request, the machine-learning model utilizing the vehicle data and the constraints data as inputs to determine the subset of the plurality of vehicles,
  inform the subset of the plurality of vehicles of the dispatch request,
  receive a result indicative of which one of the subset of the plurality of vehicles actually performed the dispatch request, and
  update training of the machine-learning model using the vehicle data, the constraints data, and the result to improve the machine-learning model in learning to identify the subset one or more of the plurality of
vehicles that are the most probable choices to handle
the dispatch request, including to
receive historical constraints data and historical
vehicle data from the plurality of vehicles;
receive historical dispatch requests during a period
of time for which the historical vehicle data and
the historical constraints data is available; and
train the machine-learning model in dispatch of the
plurality of vehicles using the historical vehicle
data, the historical constraints data, and the historical dispatch requests provided as the inputs to
the machine-learning model, and an indication of
which of the plurality of vehicles was dispatched
for the historical dispatch requests as ground truth
for intended output of the machine-learning
model,
set aside a portion of the historical vehicle data and
the historical constraints data from the training,
use the portion to validate the machine-learning
model,
perform additional training of the machine-learning
model using the historical vehicle data and the
historical constraints data responsive to the
machine-learning model not meeting with the
ground truth for at least a minimum threshold, and
apply the machine-learning model for use by the
dispatch server in handling additional dispatch
requests responsive to the machine-learning
model meeting with the ground truth for at least
the minimum threshold.

2. The system of claim 1, wherein the processor is further programmed to:
utilize the machine-learning model to identify a destination, from a plurality of destinations, for the dispatch request, the machine-learning model utilizing data including desired capabilities of the plurality of destinations, availability of the plurality of destinations, and distances to the plurality of destinations; and
inform the subset of the plurality of vehicles of the destination.

3. The system of claim 2, wherein the processor is further programmed to:
receive a result indicative of whether a correct destination location was chosen; and
update training of the machine-learning model using the vehicle data, the constraints data, and the result to improve the machine-learning model in learning for the dispatch of mobile aid and service.

4. The system of claim 1, wherein the request location is a dynamic location specified as an identifier of a vehicle or mobile device, where the processor is further programmed to track the dynamic location according to the identifier.

5. A method for use of machine learning for dispatch of mobile aid and service, comprising:
maintaining, for a plurality of vehicles available for dispatch, vehicle data and constraints data;
receiving a dispatch request requesting a vehicle to arrive at a request location;
utilizing a machine-learning model to identify a subset of the plurality of vehicles to respond to the dispatch request, the subset including vehicles indicated, by the machine-learning model, as being most probable choices to handle the dispatch request, the machine-learning model utilizing the vehicle data and the constraints data as inputs to determine the subset of the plurality of vehicles;
informing the subset of the plurality of vehicles of the dispatch request;
receiving a result indicative of which one of the subset of the plurality of vehicles actually performed the dispatch request; and
updating training of the machine-learning model using the vehicle data, the constraints data, and the result to improve the machine-learning model in learning to identify the subset one or more of the plurality of vehicles that are the most probable choices to handle the dispatch request, including
receiving historical constraints data and historical vehicle data from the plurality of vehicles;
receiving historical dispatch requests during a period of time for which the historical vehicle data and the historical constraints data is available; and
training the machine-learning model in dispatch of the plurality of vehicles using the historical vehicle data, the historical constraints data, and the historical dispatch requests provided as the inputs to the machine-learning model, and an indication of which of the plurality of vehicles was dispatched for the historical dispatch requests as ground truth for intended output of the machine-learning model,
setting aside a portion of the historical vehicle data and the historical constraints data from the training,
using the portion to validate the machine-learning model,
performing additional training of the machine-learning model using the historical vehicle data and the historical constraints data responsive to the machine-learning model not meeting with the ground truth for at least a minimum threshold, and
applying the machine-learning model for use in handling additional dispatch requests responsive to the machine-learning model meeting with the ground truth for at least the minimum threshold.

6. The method of claim 5, further comprising:
utilizing the machine-learning model to identify a destination, from a plurality of destinations, for the dispatch request, the machine-learning model utilizing data including desired capabilities of the plurality of destinations, availability of the plurality of destinations, and distances to the plurality of destinations; and
informing the subset of the plurality of vehicles of the destination.

7. The method of claim 6, further comprising:
receiving a result indicative of whether a correct destination location was chosen; and
updating training of the machine-learning model using the vehicle data, the constraints data, and the result to improve the machine-learning model in learning for the dispatch of mobile aid and service.

8. The method of claim 5, wherein the request location is a dynamic location specified as an identifier of a vehicle or mobile device, further comprising tracking the dynamic location according to the identifier.

9. A non-transitory computer-readable medium comprising instructions for use of machine learning for dispatch of mobile aid and service that, when executed by a processor, cause the processor to:
maintain, for a plurality of vehicles available for dispatch, vehicle data and constraints data;
receive a dispatch request requesting a vehicle to arrive at a request location;
utilize a machine-learning model to identify a subset of the plurality of vehicles to respond to the dispatch request, the subset including vehicles indicated, by the machine-learning model, as being most probable choices to handle the dispatch request, the machine-learning model utilizing the vehicle data and the constraints data as inputs to determine the subset of the plurality of vehicles;

inform the subset of the plurality of vehicles of the dispatch request;

receive a result indicative of which one of the subset of the plurality of vehicles actually performed the dispatch request; and update training of the machine-learning model using the vehicle data, the constraints data, and the result to improve the machine-learning model in learning to identify the subset one or more of the plurality of vehicles that are the most probable choices to handle the dispatch request, including to receive historical constraints data and historical vehicle data from the plurality of vehicles;

receive historical dispatch requests during a period of time for which the historical vehicle data and the historical constraints data is available; and train the machine-learning model in dispatch of the plurality of vehicles using the historical vehicle data, the historical constraints data, and the historical dispatch requests provided as the inputs to the machine-learning model, and an indication of which of the plurality of vehicles was dispatched for the historical dispatch requests as ground truth for intended output of the machine-learning model, set aside a portion of the historical vehicle data and the historical constraints data from the training, use the portion to validate the machine-learning model, perform additional training of the machine-learning model using the historical vehicle data and the historical constraints data responsive to the machine-learning model not meeting with the ground truth for at least a minimum threshold, and apply the machine-learning model for use by the processor in handling additional dispatch requests responsive to the machine-learning model meeting with the ground truth for at least the minimum threshold.

10. The medium of claim 9, further comprising instructions that, when executed by the processor, cause the processor to:

utilize the machine-learning model to identify a destination, from a plurality of destinations, for the dispatch request, the machine-learning model utilizing data including desired capabilities of the plurality of destinations, availability of the plurality of destinations, and distances to the plurality of destinations; and inform the subset of the plurality of vehicles of the destination.

11. The medium of claim 10, further comprising instructions that, when executed by the processor, cause the processor to:

receive a result indicative of whether a correct destination location was chosen; and update training of the machine-learning model using the vehicle data, the constraints data, and the result to improve the machine-learning model in learning for the dispatch of mobile aid and service.

12. The medium of claim 9, wherein the request location is a dynamic location specified as an identifier of a vehicle or mobile device, and further comprising instructions that, when executed by the processor, cause the processor to track the dynamic location according to the identifier.

\* \* \* \* \*